United States Patent
Saiz

(10) Patent No.: US 6,669,142 B2
(45) Date of Patent: Dec. 30, 2003

(54) LIFTING ARRANGEMENT FOR LATERAL AIRCRAFT SURFACES

(76) Inventor: Manuel Munoz Saiz, San Emilio 16, 1, 3, Madrid (ES), 28017

( * ) Notice: Subject to any disclaimer, the term of this patent is extended or adjusted under 35 U.S.C. 154(b) by 0 days.

(21) Appl. No.: 09/907,993

(22) Filed: Jul. 18, 2001

(65) Prior Publication Data

US 2002/0023985 A1 Feb. 28, 2002

(30) Foreign Application Priority Data

Jul. 26, 2000 (ES) .......................................... 2000/1870

(51) Int. Cl.[7] ................................................ B64C 1/00
(52) U.S. Cl. ......................... 244/119; 244/198; 244/36
(58) Field of Search ................. 244/36, 119, 130, 244/198, 200

(56) References Cited

U.S. PATENT DOCUMENTS

| | | | | |
|---|---|---|---|---|
| 3,604,661 A | * | 9/1971 | Mayer, Jr. ................. | 114/67 A |
| 4,225,102 A | * | 9/1980 | Frosch et al. ............... | 102/473 |
| 4,706,910 A | * | 11/1987 | Walsh et al. ............... | 114/67 R |
| 4,718,620 A | * | 1/1988 | Braden et al. .............. | 244/130 |
| 4,907,765 A | * | 3/1990 | Hirschel et al. ............ | 244/130 |
| 4,932,612 A | * | 6/1990 | Blackwelder et al. ....... | 244/130 |
| 5,988,568 A | * | 11/1999 | Drews ........................ | 244/130 |

FOREIGN PATENT DOCUMENTS

| | | | | |
|---|---|---|---|---|
| DE | | 3609541 A1 | * 9/1987 | ........... F15D/01/12 |

OTHER PUBLICATIONS

E.V. Bacher and C.R. Smith, "A Combined Visualization–Anemometry Study of the Turbulent Drag Reducing Mechanism of Triangular Micro–Groove Surface Modifications", Mar. 1985, AIAA, AIAA–85–0548.*

* cited by examiner

Primary Examiner—Michael J. Carone
Assistant Examiner—Gabriel Sukman
(74) Attorney, Agent, or Firm—Robert M. Schwartz

(57) ABSTRACT

Lifting arrangement for lateral aircraft surfaces that consists of numerous lateral flutings, grooves, splines, flutes or riblets parallel to each other, arranged on the lateral surfaces of fuselages, fin units, pylons and gondolas of aircraft with a downward slope from the nose to the tail, with the flow of air passing through such flutings, grooves, etc., towards the rear and downwards, generating lifting by reaction, using small planes or fins to support the engines and flight control fins.

16 Claims, 2 Drawing Sheets

US 6,669,142 B2

LIFTING ARRANGEMENT FOR LATERAL AIRCRAFT SURFACES

CROSS-REFERENCE TO RELATED APPLICATIONS

This is a continuation-in-part of the Spanish patent application: P9902646 filed Dec. 1, 1999, for which priority is claimed. In addition this application claims the priority date of the Spanish application P200001870 filed Jul. 26, 2000. The basis for priority in this case is the Paris Convention for the Protection of Industrial Property (613 O.G. 23, 53 Stat 1748). The Spanish patent application was filed in the Official Patent and Trademark Office in Spain.

BACKGROUND OF THE INVENTION

1. Field of the Invention

On lateral surfaces of fuselages, fin units, pylons and gondolas of aircraft.

2. Description of the Prior Art

The lateral surfaces of existing aircraft are smooth, and if they are wave-shaped, like the German aircraft Junkers JU-52, they are parallel to the centre line of the aircraft and, as a result, do not produce a lifting effect.

DESCRIPTION OF THE INVENTION

The lifting arrangement for lateral aircraft surfaces consists of numerous lateral flutings, grooves, splines, flutes or riblets parallel to each other, arranged on the lateral surfaces of fuselages, fin units, pylons and gondolas of aircraft with a downward slope from the nose to the tail, with the flow of air passing through such flutings, grooves, etc., towards the rear and downwards, generating lifting by reaction.

The flutings, grooves, etc., can be straight or curved with their convexity in an upward direction.

The front area of the flutings, grooves, etc., can have a negative or upward slope from the nose up to approximately one-fifth of the length of the flutings, grooves, etc. The horizontal tail assemblies should be larger. They can also use a number of small planes or fins to support the engines and flight control fins.

In a variant of the invention, part of the lift is obtained by means of the wings and the rest by means of the flutings, grooves, etc.

The flutings and grooves can be rounded or wave-shaped or with flanges or edges or sawtooths, horizontal or sloped upwards or downwards.

In a variation of the invention, the flutings, grooves, etc., are arranged in several stretches in series.

The total drag to forward movement is less than that of aircraft with wings.

LIST OF REFERENCE NUMERALS

The fuselage (1), the flutings, grooves, etc., (2 and 2'), the input of a portion of the flow (3), and its output (4), the relative air flow (5), the horizontal stabilizer (6), the fin unit (7), the small plane or fin (8) and the front of the flutings, grooves, etc., (9) with a negative or upward slope from the nose up to approximately one-fifth of the length of the flutings, grooves, etc.

DETAILED DESCRIPTION OF THE INVENTION

Figure 1:
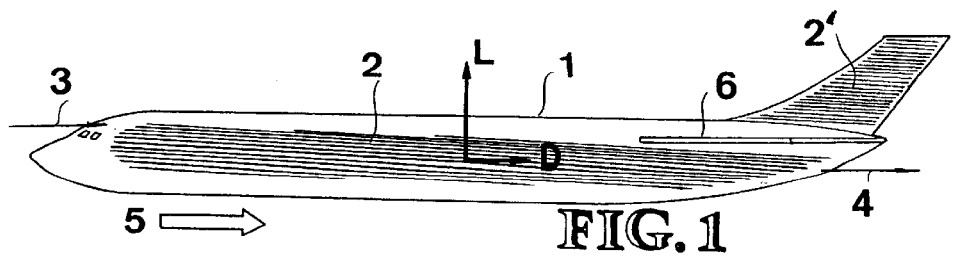
FIG. 1 shows a partial side schematic view of the fuselage in the invention.

FIG. 1 shows an aircraft whose fuselage has lateral flutings, grooves, etc., (2) of the straight type, where the air arrives at the area (3) of the flutings, grooves, etc., zone and descends leaving the area 4, having the fluting, grooves, etc., a downward slope from the nose to the tail, with the flow of air passing through such flutings, grooves, etc., towards the rear and downwards, generating lifting L by reaction and the induced drag D.

Figure 2:
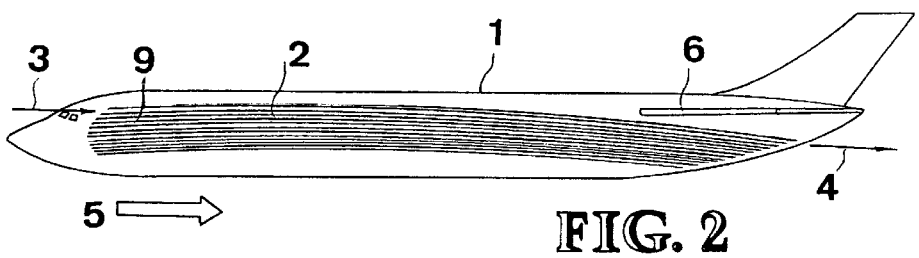
FIG. 2 shows a partial side schematic view of a variant of the fuselage.

FIG. 2 shows an aircraft whose fuselage has flutings, grooves, etc., of the curved type with the front of the flutings, grooves, etc., (9) with a negative or upward slope from the nose up to approximately one-fifth of the length of the flutings or grooves.

Figure 3:
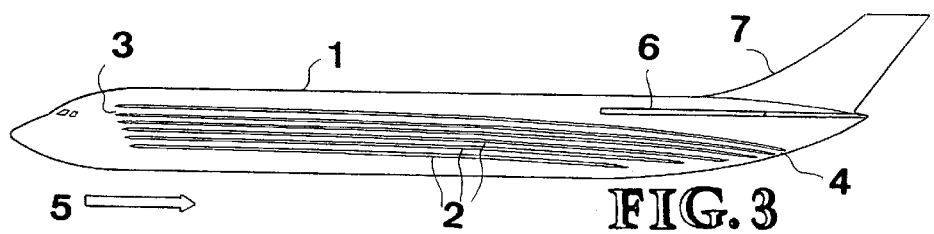
FIG. 3 shows a partial side schematic view of a variant of the fuselage.

FIG. 3 shows a variant with the grooves of the curved type more spaced out.

Figure 4:
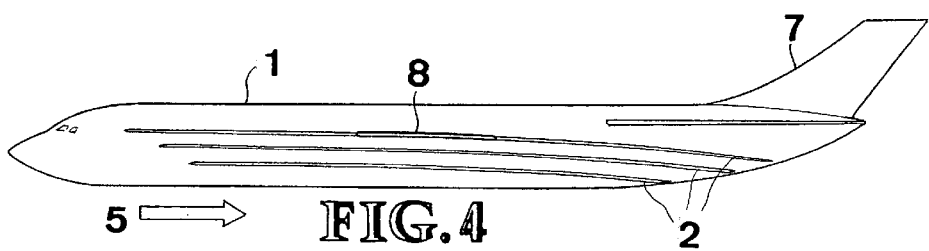
FIG. 4 shows a partial side schematic view of a variant of the fuselage.

FIG. 4 shows another variant that adds the small plane or fin (8).

Figure 5:
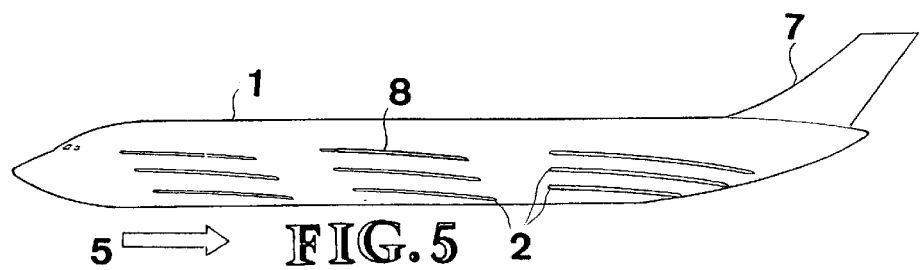
FIG. 5 shows a partial side schematic view of a variant of the fuselage.

FIG. 5 shows the grooves arranged in several stretches in series (2).

Figure 6:
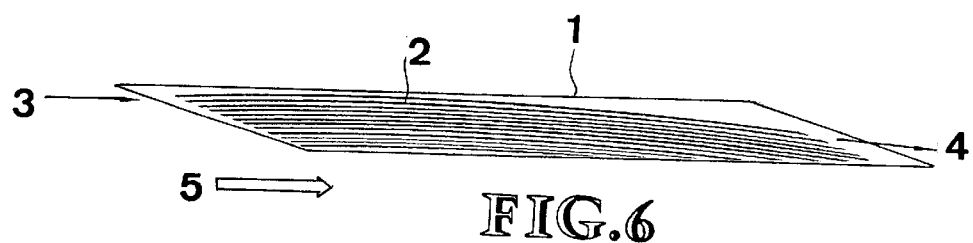
FIG. 6 shows a partial side schematic view of a variant of the fuselage.
Figure 7:
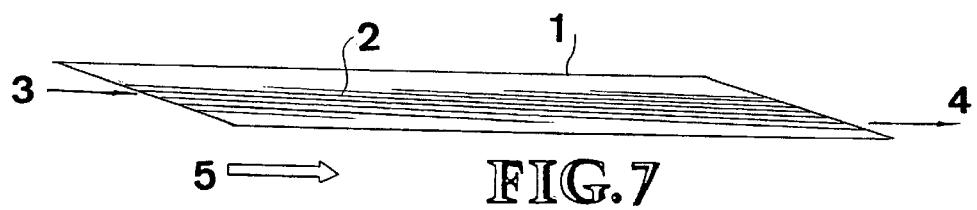
FIG. 7 shows a partial side schematic view of a variant of the fuselage.

FIGS. 6 and 7 show two arrangements with a variant of fuselage.

Figure 8:
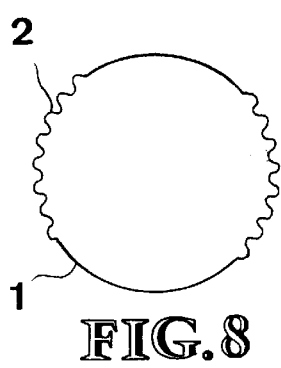
FIG. 8 shows a schematic cross-section view of one fuselage.

FIG. 8 shows the cross-section fuselage (1), with the rounded or wave-shaped grooves (2).

Figure 9:
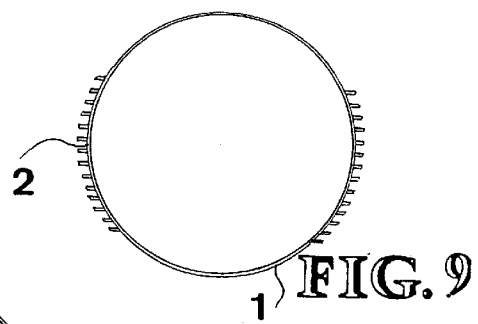
FIG. 9 shows a schematic cross-section view of one fuselage.

FIG. 9 shows the cross-section fuselage (1), with the small flanges or edges, or sawtooths (2).

Figure 10:
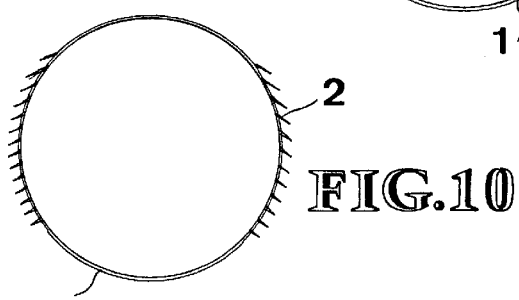
FIG. 10 shows a schematic cross-section view of one fuselage.

FIG. 10 shows the cross-section fuselage (1), with the flanges, or sawtooths (2) sloped outwards and downwards.

Figure 11:
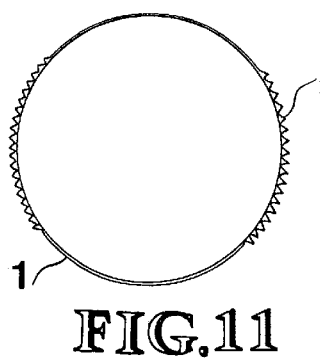
FIG. 11 shows a schematic cross-section view of one fuselage.

FIG. 11 shows the cross-section fuselage (1), with the flutings (2).

Figure 12:
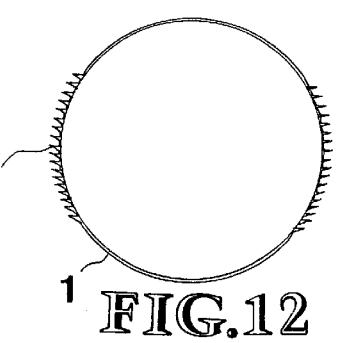
FIG. 12 shows a schematic cross-section view of one fuselage.

FIG. 12 shows the cross-section fuselage (1), with the flanges (2) sloped outwards and upwards.

What I claim is:

1. A lifting arrangement for lateral aircraft surfaces comprising a plurality of lateral elements parallel to each other arranged on the lateral surfaces of an aircraft, wherein each said lateral element of said plurality of lateral elements has a substantially constant cross-section and wherein each said lateral element of said plurality of lateral elements has a downward slope from the nose to the tail and small wings or fins, with a flow of air passing through said plurality of lateral elements towards the rear and downwards, generating lift by reaction.

2. The lifting arrangement for lateral aircraft surfaces according to claim 1 wherein the lateral elements are straight.

3. The lifting arrangement for lateral aircraft surfaces according to claim 1 wherein the lateral elements have a convexity in an upward direction.

4. A lifting arrangement for lateral aircraft surfaces according to claim 1 wherein a front area of said lateral elements includes a negative slope from said nose to approximately one-fifth of the length of said lateral elements.

5. The lifting arrangement for lateral aircraft surfaces according to claim 1 wherein said lift is generated by said wings and by said lateral elements.

6. The lifting arrangement for lateral aircraft surfaces according to claim 1 wherein said lateral elements are flutings.

7. The lifting arrangement for lateral aircraft surfaces according to claim 1 wherein said lateral elements are grooves.

8. The lifting arrangement for lateral aircraft surfaces according to claim 1 wherein said lateral elements are splines.

9. The lifting arrangement for lateral aircraft surfaces according to claim 6, wherein said flutings have horizontal flanges, edges or sawtooth elements.

10. The lifting arrangement for lateral aircraft surfaces according to claim 7, wherein said grooves are rounded.

11. The lifting arrangement for lateral aircraft surfaces according to claim 1 wherein said lateral elements have flanges, grooves, or upwards sloped sawtooth elements.

12. The lifting arrangement for lateral aircraft surfaces according to claim 1 wherein said lateral elements have flanges, grooves, or downwards sloped sawtooth elements.

13. The lifting arrangement for lateral aircraft surfaces according to claim 1 wherein said lateral elements are arranged in series.

14. The lifting arrangement for lateral aircraft surfaces according to claim 1 wherein said lateral elements are riblets.

15. The lifting arrangement for lateral aircraft surfaces according to claim 1 wherein said lateral surface is a fuselage.

16. The lifting arrangement for lateral aircraft surfaces according to claim 1 wherein said lateral surfaces are fin units.

* * * * *